United States Patent

[11] 3,552,541

[72] Inventor Darius O. Riggs
 Ottawa Lake, Mich.
[21] Appl. No. 795,121
[22] Filed Jan. 29, 1969
[45] Patented Jan. 5, 1971
[73] Assignee Owens-Illinois, Inc.
 a corporation of Ohio

[54] ARTICLE HANDLING APPARATUS
 14 Claims, 6 Drawing Figs.
[52] U.S. Cl. .................................................. 198/127,
 193/36, 193/37
[51] Int. Cl. .................................................. B65g 13/10
[50] Field of Search ........................................ 193/35, 36,
 37; 198/31, 81, 127

[56] References Cited
 FOREIGN PATENTS
1,198,735 8/1965 Germany.................... 193/35

Primary Examiner—Harvey C. Hornsby
Assistant Examiner—Merle F. Maffei
Attorneys—D. T. Innis and E. J. Holler ABSTRACT: The present invention is a novel means for diverting cartons and similar articles after discharge from a conventional inclined roller or roller belt-type conveyor to one or more takeoff branch conveyors and comprises a set of driven carrier-rollers axially parallel to the rollers of the inclined conveyor, this set of carrier-rollers being positioned in a diverting area provided at a "break-point" in the inclined conveyor and extending across the normal "straight-through" conveyor path, as well as just ahead of the branch conveyor, there being a set of bidirectional supplemental rollers arranged circumferentially about the medial portion of the carrier-rollers and adjustable as to their axial position to divert cartons generally laterally onto groups of supplemental peripheral rollers mounted in the "end zones" of the carrier-rollers, these latter supplemental rollers having their axes fixed so that together with the force of gravity, they subject the cartons resting thereon, to both a slight retrograde and limited lateral movement and thereafter advance the cartons along a fixed side, or guide rail onto the branch conveyor.

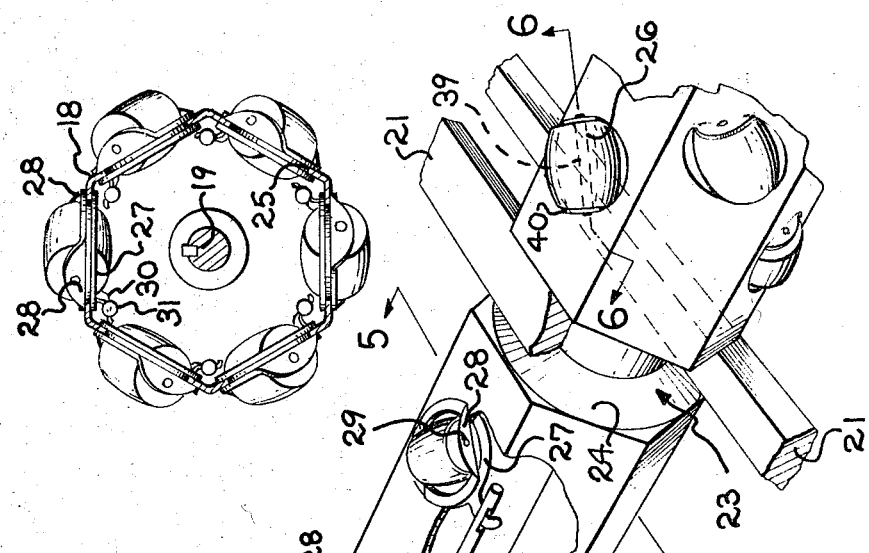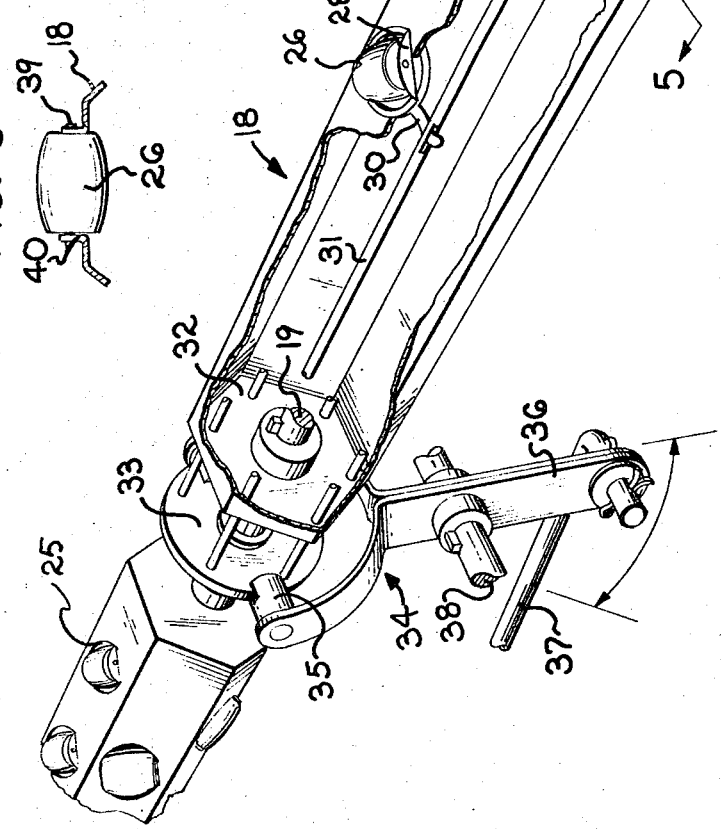

ARTICLE HANDLING APPARATUS

BACKGROUND OF THE INVENTION

Rollers which are formed by multiple supplemental rollers each rotatably mounted on a fixed spindle transverse to the axis of the main roller, which they form a part, are known in the art and disclosed in U.S. S. Pat. Nos. 3,363,735 and 1,123,851.

It is an object of my invention to provide in a carton-diverting area of a conveyor, a group of driven carrier-rollers wherein each carries a plurality of freely rotatable supplemental rollers on its periphery, these latter rollers being adjustable as to their axial position so that cartons riding thereon may be moved both laterally and longitudinally forward, as required to properly divert them to a branch conveyor, should that be desirable.

Other objects will be in part apparent and in part pointed out hereinafter.

BRIEF DESCRIPTION OF THE DRAWINGS

In the accompanying drawings forming a part of my application,

FIG. 4 is a fragmentary perspective view of one of the carrier-rollers together with the means for adjusting the angular position of the supplemental rollers axes;

FIG. 5 is a sectional elevational view taken substantially along the plane of line 5-5 of FIG. 4; and FIG. 6 is a detail sectional view taken along the plane of line 6-6 of FIG. 4, showing the mounting for one of the fixed-axis supplemental rollers.

In the illustrated embodiment of my invention, it is shown in conjunction with an inclined endless conveyor consisting of two conveyor sections 10 and 10a having spaced-apart ends 11 and each said section composed of a series of horizontal rollers 12 which may support a moving article-supporting belt 13. In FIG. 1 the belt 13 of conveyor section 10 is advanced by the positively driven roller 14, there being a powered gear 15 or pinion at one end of the roller shaft 15a which is connected to a source of power (not shown). The belt 13 of the other conveyor section 10a may well be similarly powered. Cartons C, C1 and C2 are the articles illustrated as being transported on these conveyors. At each side of the forward conveyor section 10a (FIG. 1) is a divergent or takeoff branch conveyor 16, shown lying in a common plane with the main conveyor sections 10 and 10a. Framework including opposed downwardly converging siderails 17, or carton guide rails, at least in part support these divergent conveyors 16 and connect them to the main conveyor sections 10 and 10a. Within the confines of these siderails 17 is my invention.

Figure 1:
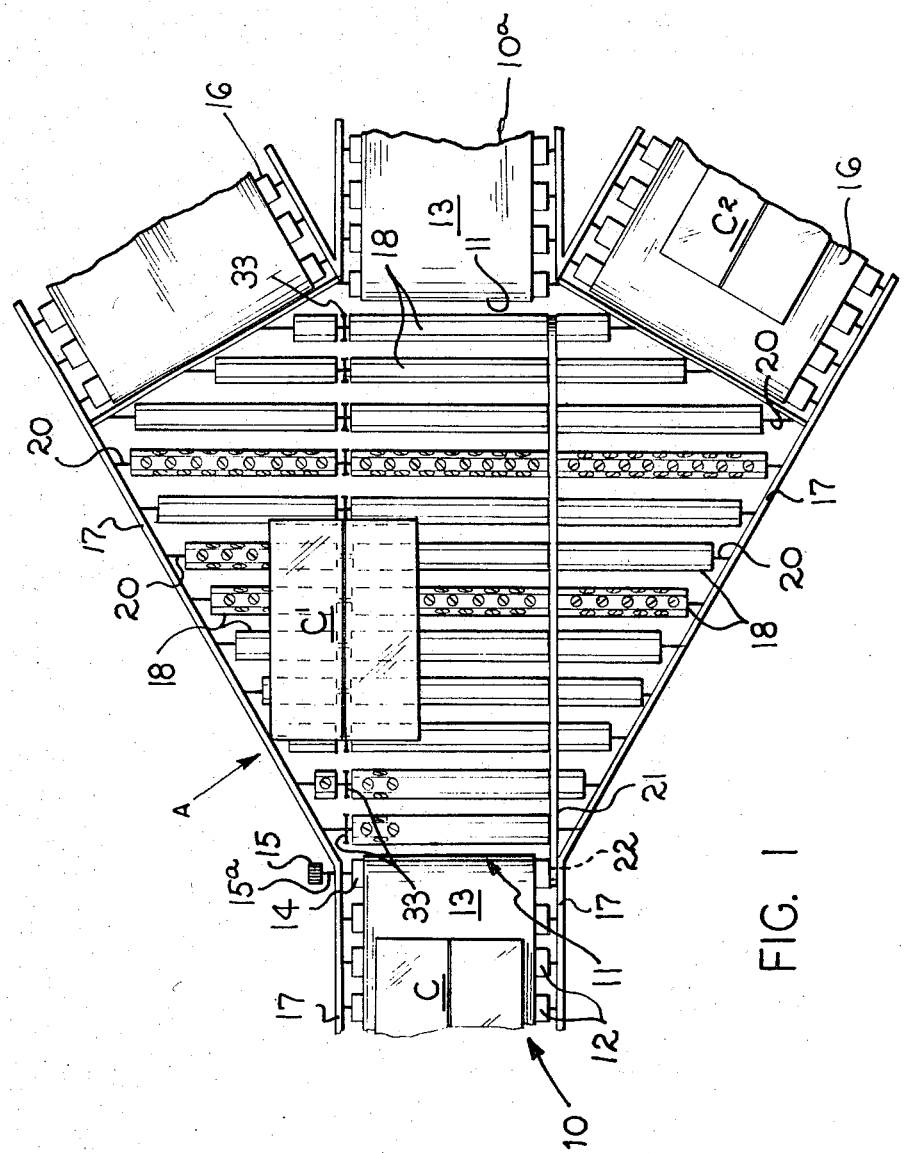
FIG. 1 is a fragmentary top plan view in which I have shown only a few of the supplemental rollers on the carrier-rollers.

My invention, which functions to divert cartons to either of the branch conveyors 16, or alternatively transfer them from conveyor section 10 to section 10a of the main conveyor, comprises a plurality of driven horizontal carrier rollers 18 axially disposed parallel to the rollers 12 of the main conveyor sections 10 and 10a and are carried by shafts 19, the ends 20 of which are, or may be, rotatably mounted in the siderails 17. As shown, these carrier-rollers 18 necessarily vary in length, quite substantially. These carrier-rollers 18, which may be hexagonal in cross section may well be driven by means of an endless V-belt 21 which is trained over a pulley 22 at one end of the roller 14 (FIGS. 1 and 2) and runs in firm frictional engagement with the walls of annular channel 23 in the carrier-rollers 18.

These carrier-rollers 18 are hollow and each of the several flat sides 24 thereof has radial, supplemental roller accommodating openings 25, these supplemental rollers 26 being generally barrel shaped and as will be apparent presently, comprising the means for determining the direction of travel of cartons in the diverting area A, between the sections 10 and 10a of the main conveyor. To this end the group of supplemental rollers 26, in that section of each of the carrier-rollers 18 aligned with and corresponding in length to that of the rollers 12 of the conveyor sections 10 and 10a, are bidirectional in that they are so mounted that their axes of rotation may, at the will of the operator, or by automatic control means, be disposed normal to the axis of the carrier-roller 18, or alternatively positioned generally parallel to the length of that takeoff, or branch conveyor 16, to which cartons are to be transferred, or diverted. It, of course, is essential to the successful operation of the apparatus, as a directional control device, that the axes of these supplemental rollers 26 not be precisely parallel to the axes of their carrier-rollers 18, since in such position they would not be able to directionally control the carton travel. Normally, the axes of the center group of supplemental rollers are parallel to the length of the main conveyor sections so that cartons or similar articles will be advanced along a straight line from section 10 to the second section 10a. If, however, it is desired to divert cartons, or a succession of same, to the upper takeoff conveyor 16 (FIG. 1), for example, these bidirectional supplemental rollers 26 will be repositioned axially as a group so that their axes generally correspond angularly to those of the group of fixed axis supplemental rollers just in advance of the entrance to the branch conveyor 16.

Figure 3:
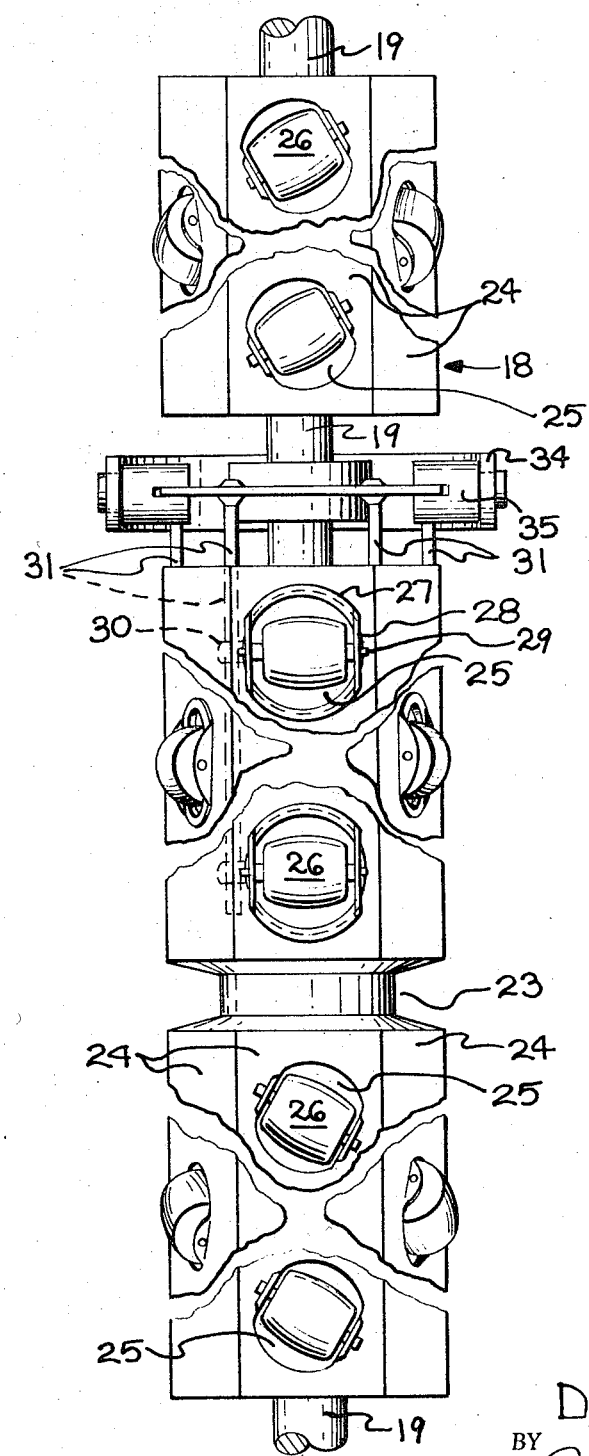
FIG. 3 is a fragmentary top plan view of one of the main carrier-rollers.

Repositioning of this center group of small bidirectional rollers 26, axially, is made possible by mounting each in a carrier-ring 27 (FIGS. 4 and 5) which is rotatably secured in one of the openings 25 in the carrier-rollers 18. A pair of upstanding diametrically opposed ears 28 on the carrier-ring 27 provide bearings for the ends of the carrier-rollers shaft 29. Each carrier-ring 27 has a radial finger 30 intended for connection to a pushrod 31 (FIG. 4). As shown, there are six such pushrods, one for each flat side of the carrier-roller 18, with each rod 31 connected to a longitudinal series of the ring-carriers 27. Each such rod 31, at one end, extends through an opening in a transverse wall 32 which in part slidingly supports the several pushrods. The extreme outer end of each pushrod is secured to a disc 33 which is axially slidably mounted on the shaft 19. Such axial movement of all of these rods for the purpose of correspondingly and simultaneously changing the angular position of all of the supplemental bidirectional rollers 26 on a single carrier-roller, is effected by a swingable yoke 34 or lever, provided with fingers 35 straddling diametrically opposed peripheral portions of the disc 33. An arm 36 of said yoke 34 is connected to a control rod 37 which may be manually, or mechanically, manipulated to move the carrier-ring 27 on its axis, as desired. In order that all of the adjustable bidirectional rollers 26 on the several carrier-rollers may be simultaneously repositioned axially, to the same extent, the yokes or levers just referred to are keyed to a common shaft 38 (FIGS. 3 and 4). The group of supplemental rollers 26 at either side of the bidirectional rollers have their axes fixed (FIG. 6), as to their angular position, such rollers also having their supporting shafts 39 journaled in bearings created by upturned ears 40 provided at diametrically opposed margins of the openings 25.

Figure 2:
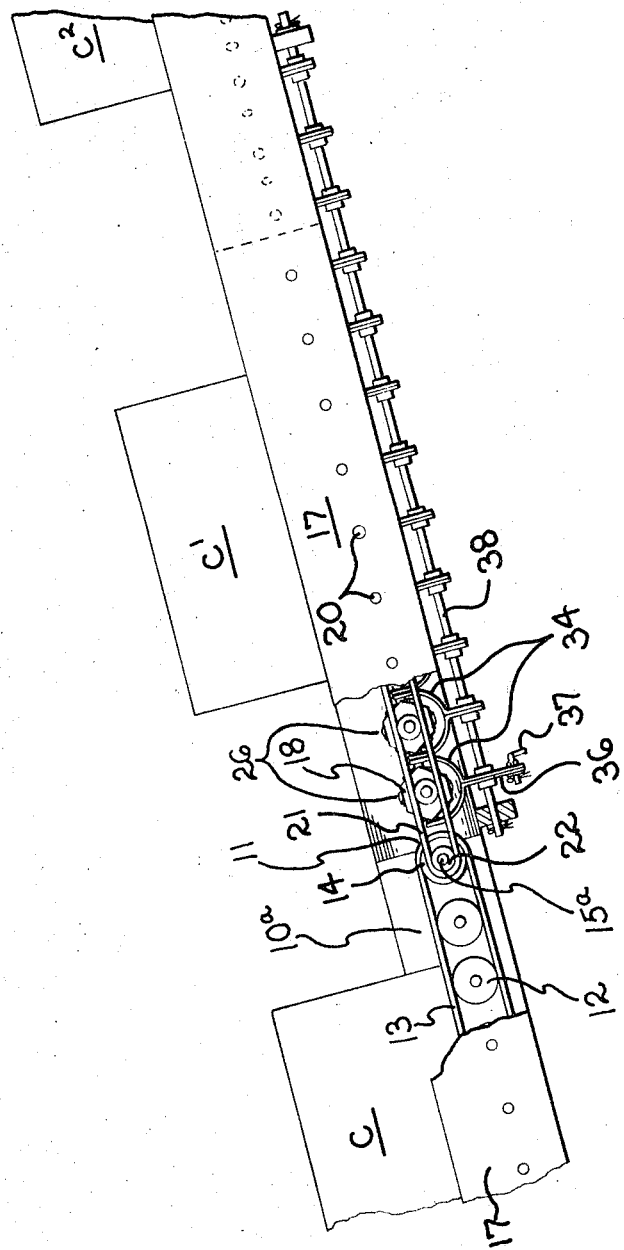
FIG. 2 is a side elevational view with portions of the siderail, or wall, broken away.

It will be evident that, for example, with the small rollers positioned axially as in FIG. 1, cartons moving onto the diverting section in area A will first move under influence of gravity and guidance of the bidirectional rollers 26 to that area in which the fixed axis supplemental rollers are substantially if not precisely parallel axially with the bidirectional rollers. This immediately creates a retrograde carton movement and such continues until the carton contacts the side rail 17. At this point the carrier-rollers 18 move the carton upwardly sliding it along the siderail and onto the adjacent branch conveyor 16. These carrier-rollers 18 are rotated at a higher speed than the rollers 12 so that despite the lateral and retrograde travel of the cartons in the diverting area A, they will advance sufficiently rapidly to maintain adequate spacing apart of successive cartons.

Although I have illustrated my invention in relation to an inclined conveyor system, it is understood that it could be used with equal efficiency with a declined conveyor, the only, and very minor change being that the angle of the axes of the supplemental rollers would be reversed from that illustrated in FIG. 1, so that gravity, together with the direction of rotation of the supplemental rollers upon which the cartons rest, will cause the latter to be diverted to one side or the other. The carrier-rollers then positively advance the cartons to the corresponding branch. Here the carrier-rollers will rotate at a lower speed than the main conveyor drive roller 12, in contrast to the higher carrier-roller speed where the cartons are moving upwardly as in FIG. 2.

I claim:

1. Apparatus for diverting cartons discharged from one end of an elongated inclined conveyor to a branch conveyor disposed at an acute angle to the latter, comprising, a series of driven carrier-rollers arranged side by side at least in part in the plane of said inclined conveyor and rotatable on horizontal axes disposed transverse to the length of the inclined conveyor, a plurality of freely rotatable supplemental rollers mounted on the carrier-rollers about their circumference, certain of the supplemental rollers being angularly positioned and others being angularly positionable so that cartons resting thereon will freely move laterally thereon under the influence of gravity to one end of the carrier-rollers, and means operable both to limit the extent of such lateral movement of the cartons on the supplemental rollers and guide them to the branch conveyor during their advance under influence of the driven carrier-rollers.

2. Apparatus as defined in claim 1, the last-named means being an elongated guide rail extending from the inclined conveyor to the branch conveyor.

3. Apparatus as defined in claim 1, the positionable rollers being mounted in ring-carriers, and means for angularly moving said carriers to correspondingly change the angle of the axes of the supplemental rollers.

4. Apparatus as defined in claim 1, the positioned supplemental rollers being in a group between the positionable rollers and the last-named means and having their axes of rotation fixed.

5. Apparatus as defined in claim 1, each of the carrier-rollers having a circumferential series of longitudinal flat surfaces provided with radial openings to accommodate the supplemental rollers, said supplemental rollers in part extending into the carrier-rollers.

6. Apparatus as defined in claim 1, the carrier-rollers rollers being hollow, and means at least in part within certain of these rollers for angularly changing the axes of rotation of the positionable supplemental rollers.

7. Apparatus as defined in claim 6, said angle-varying means comprising pushrods connected to selected groups of the supplemental rollers and means for simultaneously operating the pushrods.

8. Apparatus as defined in claim 7, the last-named means comprising a disc coaxial with and axially shiftable relative to each carrier-roller, the pushrods being attached to the disc and means associated with the disc for shifting it axially and thereby moving the pushrods.

9. Apparatus as defined in claim 8, and means whereby all of the discs may be shifted axially simultaneously.

10. In combination, an elongated carrier-roller, a multiplicity of freely rotatable supplemental rollers mounted upon the circumference of the carrier-roller with their axes of rotation parallel to each other, said supplemental rollers being so mounted as to be capable of adjustment to change the angular relationship between their axes and the axis of the carrier-roller 11. A carrier-roller as defined in claim 10, and a rotatable carrier-ring for each supplemental roller connecting it to the carrier-roller.

12. In a carrier-roller as defined in claim 10, the supplemental rollers being arranged in circumferentially spaced-apart, longitudinal rows, along the carrier-roller and in staggered relationship circumferentially of the latter.

13. A carrier-roller as defined in claim 11, and means for imparting rotary motion to all of the carrier-rings simultaneously and to the same extent.

14. A carrier-roller as defined in claim 12, pushrods individual to and operatively connected to the rollers of each said row, and means for reciprocating the pushrods in unison.